(12) United States Patent
Aoyagi et al.

(10) Patent No.: US 10,093,855 B2
(45) Date of Patent: *Oct. 9, 2018

(54) METHOD FOR PRODUCING BETA-SIALON FLUORESCENT MATERIAL

(71) Applicant: NICHIA CORPORATION, Anan-shi, Tokushima (JP)

(72) Inventors: Kenichi Aoyagi, Tokushima (JP); Takashi Kaide, Anan (JP); Motoharu Morikawa, Anan (JP); Shoji Hosokawa, Tokushima (JP)

(73) Assignee: NICHIA CORPORATION, Anan-shi (JP)

( * ) Notice: Subject to any disclaimer, the term of this patent is extended or adjusted under 35 U.S.C. 154(b) by 148 days.

This patent is subject to a terminal disclaimer.

(21) Appl. No.: 15/172,862

(22) Filed: Jun. 3, 2016

(65) Prior Publication Data

US 2016/0355731 A1    Dec. 8, 2016

(30) Foreign Application Priority Data

Jun. 5, 2015 (JP) .................................. 2015-115242
May 9, 2016 (JP) .................................. 2016-093703

(51) Int. Cl.
*C09K 11/77* (2006.01)

(52) U.S. Cl.
CPC ................................ *C09K 11/7734* (2013.01)

(58) Field of Classification Search
CPC ............ C09K 11/7734; C09K 11/0883; C09K 11/617; C09K 11/7792; C09K 11/08
USPC ....................... 252/301.4 H, 301.4 F, 301.4 R
See application file for complete search history.

(56) References Cited

U.S. PATENT DOCUMENTS

| 2007/0108896 A1 | 5/2007 | Hirosaki |
| 2010/0219741 A1 | 9/2010 | Kawasaki et al. |
| 2011/0248303 A1* | 10/2011 | Suzuki ............... C09K 11/7734 257/98 |
| 2012/0043503 A1* | 2/2012 | Li ....................... C09K 11/7734 252/301.4 F |
| 2012/0228551 A1 | 9/2012 | Emoto et al. |
| 2012/0305844 A1 | 12/2012 | Emoto et al. |

FOREIGN PATENT DOCUMENTS

| JP | 2005-255895 A | 9/2005 |
| JP | 2007-326981   | 12/2007 |
| JP | 2011-174015   | 9/2011 |
| JP | 2012-056804   | 3/2012 |
| JP | 2012082269 A  | 4/2012 |
| JP | 2013-173868 A | 9/2013 |
| WO | 2011/058919 A | 5/2011 |

OTHER PUBLICATIONS

Office Action (with English translation) dated Aug. 9, 2016, in Japanese Patent Application No. 2016-093703.

* cited by examiner

*Primary Examiner* — Matthew E Hoban
*Assistant Examiner* — Lynne Edmondson
(74) *Attorney, Agent, or Firm* — Hunton Andrews Kurth LLP

(57) ABSTRACT

A method for producing a β-sialon fluorescent material is provided. The method includes heat-treating a mixture containing an aluminum compound, a first europium compound, and silicon nitride to obtain a first heat-treated product; and heat-treating the first heat-treated product with a second europium compound in a rare gas atmosphere to obtain a second heat-treated product.

11 Claims, 2 Drawing Sheets

METHOD FOR PRODUCING BETA-SIALON FLUORESCENT MATERIAL

CROSS-REFERENCE TO RELATED APPLICATION

This application claims priority to Japanese Patent Application No. 2015-115242, filed on Jun. 5, 2015 and Japanese Patent Application No. 2016-093703, filed on May 9, 2016, the entire disclosures of which are incorporated herein by reference.

BACKGROUND OF THE INVENTION

Field of the Invention

The present disclosure relates to a method for producing a β-sialon fluorescent material.

Description of the Related Art

Light emitting devices including, in combination, a light source, and a wavelength conversion member, which is capable of emitting light with hues different from the hue of the light source when excited by the light from the light source, and thus capable of emitting light of various hues owing to the principle of the mixture of colors of light, are being developed.

In particular, light emitting devices composed of a light emitting diode ("LED") combined with a fluorescent material are increasingly and widely utilized, for example, as backlights for liquid crystal displays or as lighting systems. When a light emitting device incorporates more than one fluorescent material, a fluorescent material that emits light at short wavelengths, such as blue-green, green, and yellow-green, and a fluorescent material that emits light at long wavelengths, such as orange and red, may be combined, for example, to allow liquid crystal displays to have an improved color reproduction range and lighting systems to have an improved color rendering.

As examples of such fluorescent materials, aluminate fluorescent materials, silicate fluorescent materials, sulfide fluorescent materials, phosphate fluorescent materials, and borate fluorescent materials are known. As a replacement of these fluorescent materials, fluorescent materials that have a nitrogen-containing inorganic crystal as a host crystal in the crystalline structure, such as sialon fluorescent materials, oxynitride fluorescent materials, and nitride fluorescent materials, have been proposed. Such fluorescent materials exhibit small luminance decrease associated with temperature increase and have superior durability. A representative example of such fluorescent materials is sialon, which is a solid solution of silicon nitride. α-type sialon fluorescent materials and β-type sialon fluorescent materials, which have different crystalline structure from each other, are attracting attention. In particular, β-type sialon fluorescent materials (hereinafter also referred to as "β-sialon fluorescent materials") are highly efficient, green fluorescent materials that are excited in a wide wavelength range of from near-ultraviolet light to blue light, and have a peak light emission wavelength in the range of 520 to 550 nm.

β-sialon fluorescent materials are represented by the formula: $Si_{6-z}Al_zO_zN_{8-z}$:Eu (0<z≤4.2). A β-sialon fluorescent material may be obtained as a burned product by mixing silicon nitride ($Si_3N_4$), aluminium nitride (AlN), aluminium oxide ($Al_2O_3$), and europium oxide ($Eu_2O_3$), which serves as an activator, in a predetermined molar ratio, and burning the mixture at around 2000° C. It has been disclosed that heat-treating the sintered product in an inert gas, and acid-treating the resultant product will produce a β-sialon fluorescent material with high luminance (see, for example, JP 2005-255895 A and JP 2011-174015 A). A method of performing heating treatment separately twice at a high temperature to further improve the properties of the β-sialon fluorescent material to be obtained, and also a method of using, as a part of raw materials, a β-sialon fluorescent material obtained by sintering to enhance the luminance, are known (see, for example, JP 2007-326981 A and JP 2013-173868 A).

SUMMARY OF INVENTION

A method for producing a β-sialon fluorescent material superior in light emitting luminance is provided. The method includes heat-treating a mixture containing an aluminium compound, a first europium compound, and silicon nitride to obtain a first heat-treated product; and heat-treating the first heat-treated product with a second europium compound in a rare gas atmosphere to obtain a second heat-treated product.

DETAILED DESCRIPTION OF THE EMBODIMENT

Figure 1:
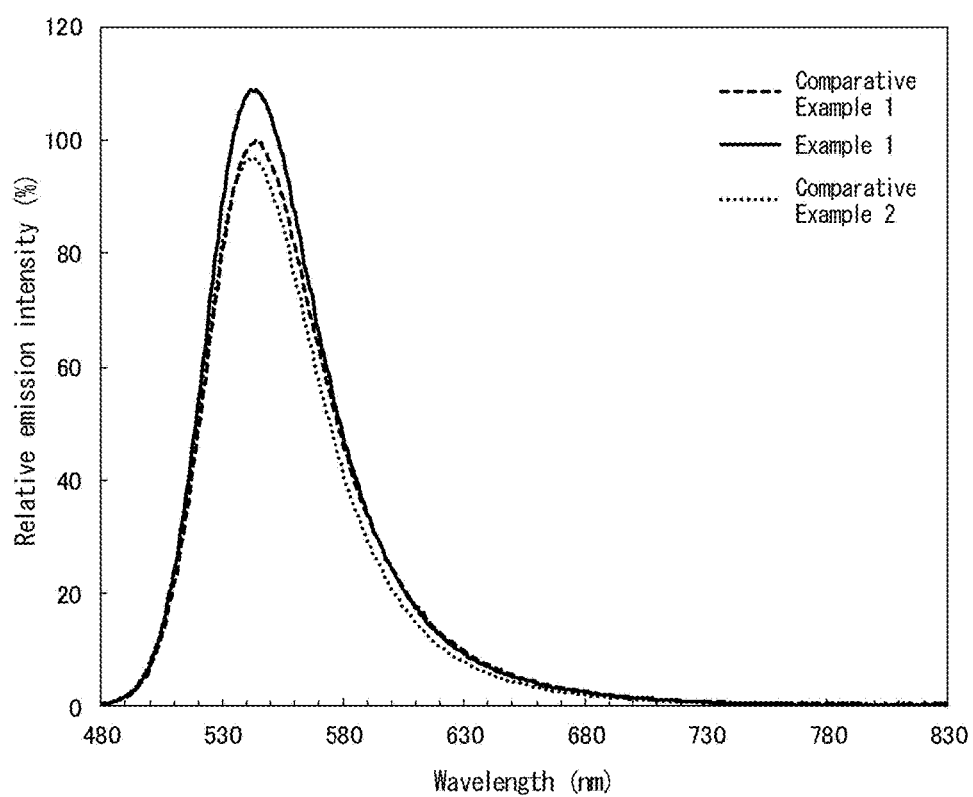
FIG. 1 is a graph showing a light emitting spectrum of a β-sialon fluorescent material according to the present embodiment.

There has been, however, a demand for still further improvement in luminance of β-sialon fluorescent materials in a practical aspect. Hence, an object according to an embodiment of this disclosure is to provide a method for producing a β-sialon fluorescent material superior in light emitting luminance.

In view of the problem, the inventors found, as a result of intensive study, that in a step of heat-treating a β-sialon fluorescent material, after obtaining a β-sialon fluorescent material having, for example, a desired particle diameter, by heat-treating the β-sialon fluorescent material and a europium compound at a relatively low temperature under the condition that both are present in a same atmosphere, a β-sialon fluorescent material further superior in light emitting luminance can be obtained, and accomplished the present invention. That is, the present disclosure includes the following embodiments.

A method for producing a β-sialon fluorescent material includes a first heat treatment step of heat-treating a mixture containing an aluminium compound, a first europium compound, and silicon nitride to obtain a first heat-treated product, and a second heat treatment step of heat-treating the first heat-treated product with a second europium compound in a rare gas atmosphere to obtain a second heat-treated product.

According to an embodiment of the present disclosure, a method for producing a β-sialon fluorescent material superior in light emitting luminance can be provided.

A method for producing a β-sialon fluorescent material according to the present disclosure will be described below with reference to embodiments. The embodiments shown below, however, are mere examples of the production method, for example, for embodying the technical concept of the present invention, and the method for producing a β-sialon fluorescent material of the present invention is not limited to the following embodiments.

The relationship between the color names and the chromaticity coordinates, the relationship between the wavelength ranges of light and the color names of monochromatic light, and others are in accordance with Japanese Industrial Standard (JIS) Z8110. Specifically, light in the range of 380 nm to 410 nm is violet, light in the range of 410 nm to 455 nm is blue-violet, light in the range of 455 nm to 485 nm is blue, light in the range of 485 nm to 495 nm is blue-green, light in the range of 495 nm to 548 nm is green, light in the range of 548 nm to 573 nm is yellow-green, light in the range of 573 nm to 584 nm is yellow, light in the range of 584 nm to 610 nm is yellow-red, and light in the range of 610 nm to 780 nm is red.

As used herein, the term "step" means not only an independent step but also a step which cannot be clearly distinguished from the other steps but can achieve the anticipated effect of that step. Further, for the amount of each component contained in a composition, when a plurality of substances corresponding to the component exist, the amount of the component means the total amount of the substances present in the composition unless otherwise specified.

The mean particle diameter is a volume median diameter (Dm), which is measured by a pore electrical resistance method (Electrical sensing zone method) based on the Coulter principle. Specifically, a particle size distribution is measured using a particle size distribution measuring device (e.g., Multisizer manufactured by Beckman Coulter), and a volume median diameter (Dm) is obtained as a particle diameter corresponding to a cumulative volume of 50% from a minor diameter side of the particle.

Method for Producing a β-Sialon Fluorescent Material

The method for producing a β-sialon fluorescent material of the present embodiment includes a first heat treatment step of heat-treating a mixture containing an aluminium compound, a first europium compound, and silicon nitride to obtain a first heat-treated product, and a second heat treatment step of heat-treating the first heat-treated product with a second europium compound in a rare gas atmosphere to obtain a second heat-treated product. The β-sialon fluorescent material may have a composition represented by formula (I).

$$Si_{6-z}Al_zO_zN_{8-z}:Eu \quad (I)$$

In the formula (I), z satisfies 0.0<z≤4.2.

The second heat treatment step is a step having an effect of decomposing, for instance, an unstable crystalline or non-crystalline portion that is present in a β-sialon fluorescent material, and an effect of further reducing europium that is contained in the β-sialon fluorescent material. The second heat treatment step is performed in a rare gas atmosphere, causing a europium compound to be present in the rare gas atmosphere, and heat-treating the first heat treated product together with the europium compound allows efficient production of a β-sialon fluorescent material superior in light emitting luminance to β-sialon fluorescent materials obtained by conventional production methods. This can be, for instance, considered as follows. In the second heat treatment step, a europium compound is reduced in a rare gas atmosphere, generating a gaseous product at least a portion of which is derived from a europium compound. When the gaseous product comes into contact with the first heat-treated product, europium contained in the first heat-treated product becomes readily reduced into a bivalent state. It is also believed that a gaseous product derived from a europium compound in a reduced state is incorporated into the first heat-treated product. As a result of these factors combined, emission luminance is believed to be further improved.

The first heat-treated product obtained by the first heat treatment step itself is a β-sialon fluorescent material, for instance, represented by formula (I). In general, the first heat treatment step is performed at a high temperature of 1850° C. or more. There is also a technique of adding a europium compound in portions in this heat-treatment at a high temperature. In general, an object of the first heat treatment step is to cause europium to be incorporated into the crystal of β-sialon. In the embodiment of the present disclosure, causing a europium compound to be coexist at the time of reduction heat-treatment (the second heat treatment step) of the β-sialon fluorescent material that is already activated with europium, is believed to, for instance, further enhance the reduced state of the europium contained in the β-sialon fluorescent material, enabling the production of a β-sialon fluorescent material having superior emission luminance that cannot be achieved by conventional production methods.

First Heat Treatment Step

In the first heat treatment step, a mixture containing an aluminium compound, a first europium compound, and silicon nitride (hereinafter also referred to as "raw material mixture") is heat-treated to obtain a first heat-treated product.

The raw material mixture contains at least one aluminium compound, at least one first europium compound, and at least one silicon nitride.

Examples of the aluminium compound include aluminium-containing oxide, hydroxide, nitride, oxynitride, fluoride, and chloride. In place of at least a portion of the aluminium compound, a simple aluminium metal or an aluminium alloy may be used. Specific examples of the aluminium compound include aluminium nitride (AlN), aluminium oxide ($Al_2O_3$), and aluminium hydroxide ($Al(OH)_3$). Preferably, at least one selected from the group consisting of aluminium nitride (AlN), aluminium oxide ($Al_2O_3$), and aluminium hydroxide ($Al(OH)_3$) is used. These aluminium compounds may be used alone or in combination.

The particle diameter of the aluminium compound to be used as a raw material is not particularly limited, and may be selected as appropriate from common particle diameters. The mean particle diameter of the aluminium compound may be, for instance, from 0.01 μm to 20 μm, or from 0.1 μm to 10 μm.

The purity of the aluminium compound is not particularly limited, and may be, for instance, 95% by weight or more, or 99% by weight or more.

Examples of the first europium compound include europium-containing oxide, hydroxide, nitride, oxynitride, fluoride, and chloride. In place of at least a portion of the first europium compound, a simple europium metal or a europium alloy may be used. Specific examples of the first europium compound include europium oxide ($Eu_2O_3$), europium nitride (EuN), and europium fluoride ($EuF_3$). For instance, at least one selected from the group consisting of europium oxide ($Eu_2O_3$), europium nitride (EuN), and europium fluoride ($EuF_3$) is used. These first europium compounds may be used alone or in combination.

The particle diameter of the first europium compound to be used as a raw material is not particularly limited, and may be selected as appropriate from common particle diameters. The mean particle diameter of the first europium compound may be, for instance, from 0.01 μm to 20 μm, or from 0.1 μm to 10.0 μm.

The purity of the first europium compound is not particularly limited, and may be, for instance, 95% by weight or more, or 99.5% by weight or more.

The silicon nitride is a silicon compound containing a nitrogen atom and a silicon atom, and may be silicon nitride containing an oxygen atom. When the silicon nitride contains an oxygen atom, the oxygen atom may be contained in the form of silicon oxide, or in the form of an oxynitride of silicon.

The content of the oxygen atom contained in the silicon nitride may be, for instance, less than 2% by weight, or 1.5% by weight or less. The content of the oxygen atom may be also, for instance, 0.3% by weight or more, or 0.4% by weight or more. The purity of the silicon nitride is not particularly limited, and may be, for instance, 95% by weight or more, or 99% by weight or more.

The particle diameter of the silicon nitride is not particularly limited, and may be selected as appropriate from common particle diameters. The mean particle diameter of the silicon nitride may be, for instance, from 0.01 μm to 15 μm, or from 0.1 μm to 5.0 μm. The mean particle diameter is correlated with, for instance, the specific surface area, and the larger the specific surface area, the smaller the mean particle diameter is likely to be.

The mixing ratio of the aluminium compound, the first europium compound, and the silicon nitride in the raw material mixture is not particularly limited as long as a β-sialon fluorescent material represented by formula (I) is obtained, and may be selected as appropriate depending on the desired composition. For instance, the molar ratio of silicon atom to aluminium atom contained in the raw material mixture may be (6-z):z (0.0<z≤4.2), and preferably 0.01<z<1.0. The molar ratio of the combined molar quantity of silicon atom and aluminium atom to the molar quantity of europium atom may be, for instance, 6:0.001 to 6:0.05, or 6:0.003 to 6:0.02.

The raw material mixture may contain a flux, such as halide. By a flux being contained in the raw material mixture, the reaction among the raw materials in the raw material mixture is further promoted, and a more uniform solid-phase reaction is facilitated, resulting in a fluorescent material having a large particle diameter and superior light emission properties. This is believed to be attributable, for instance, to the fact that the temperature of the first heat treatment step in the production method is equal to or greater than the temperature of the formation of the liquid phase including halide, which is a flux. Examples of halides usable include rare-earth metals, alkaline-earth metals, and chlorides or fluorides of alkali metals. The flux may be added as a compound that helps the element ratio of the cations to achieve the target composition, or may be further added as an additive after various materials are added to make up the target composition.

When the raw material mixture contains a flux, the content of the flux in the raw material mixture may be, for instance, 20% by mass or less, or 10% by mass or less. The content of the flux may be also, for instance, 0.1% by mass or more.

The raw material mixture may be obtained by weighing desired material compounds in a desired compounding ratio, and then mixing the material compounds by a mixing method using a ball mill, or a mixing method using a mixing machine, such as a Henschel mixer or a V-blender, or using a mortar and a pestle. The mixing may be dry mixing or wet mixing by adding, for instance, a solvent.

The temperature of the heat treatment in the first heat treatment step may be from 1850° C. to 2100° C., from 1900° C. to 2050° C., 1920° C. to 2050° C., or 2000° C. to 2050° C. Heat-treatment at a temperature of 1850° C. or more enables efficient formation of β-sialon, and easier incorporation of Eu into the crystal, resulting in a desired β-sialon fluorescent material. Heat treatment at a temperature of 2100° C. or less is likely to suppress degradation of the resulting β-sialon fluorescent material.

The atmosphere of the first heat treatment step is not particularly limited as long as the desired β-sialon fluorescent material is obtained. The atmosphere of the first heat treatment step may be a nitrogen gas-containing atmosphere, and is, essentially a nitrogen gas atmosphere. When the atmosphere of the first heat treatment step contains a nitrogen gas, the atmosphere may contain another gas, such as hydrogen, oxygen, or ammonia, in addition to the nitrogen gas. The content of the nitrogen gas in the atmosphere of the first heat treatment step may be, for instance, 90% by volume or more, or 95% by volume or more.

The pressure in the first heat treatment step is not particularly limited, and may be selected as appropriate depending on, for example, the purpose. The pressure may be, for instance, from ordinary pressure to 200 MPa. To suppress degradation of the β-sialon fluorescent material to be generated, the pressure may be high, from 0.1 MPa to 200 MPa, or from 0.6 MPa to 1.2 MPa, because this range imposes less restriction on industrial equipment.

In the first heat treatment step, the heat treatment is performed, for instance, by elevating the temperature from room temperature to a predetermined temperature. The time required for elevating the temperature is not particularly limited, and may be, for instance, from 1 hour to 48 hours, from 2 hours to 24 hours, or from 3 hours to 20 hours. When the time for elevating the temperature is 1 hour or more, the growth of the fluorescent material particles is likely to fully proceed, and Eu is likely to be easily incorporated into the crystal of the fluorescent material particles.

In the first heat treatment step, a retention time at a predetermined temperature may be provided. The retention time is not particularly limited, and may be, for instance, from 1 hour to 48 hours, from 2 hours to 30 hours, and from 3 hours to 20 hours.

The time for lowering the temperature from a predetermined temperature to room temperature in the first heat treatment step is not particularly limited, and may be, for instance, from 0.1 hour to 20 hours, from 1 hour to 15 hours, or from 3 hours to 12 hours.

The first heat treatment step may be performed, for instance, by putting the raw material mixture into a boron nitride crucible.

After the first heat treatment step, a sizing step including operations in combination of crushing, grinding, and classifying a first heat-treated product resulting from the heat treatment, may be performed. Particles of a desired particle diameter may be obtained by the sizing step. Specifically, after roughly grinding a heat-treated product, the resulting heat-treated product may be ground using a common grinder, such as a ball mill, a jet mill, and a vibration mill to have a predetermined particle diameter. Excessive grinding, however, may cause defects on the surface of the fluorescent material particles, resulting in luminance decrease. When particles having different particle diameters are present after grinding, the particle diameters may be made uniform by classifying the particles. The final adjustment of the particle diameter may also be made after a second heat treatment step or acid-treatment step described later.

Second Heat Treatment Step

In the second heat treatment step, the first heat-treated product and the second europium compound are heat-treated in a rare gas atmosphere to obtain a second heat-treated product. Heat-treating the first heat-treated product in coexistence with the second europium compound in a rare gas atmosphere enables production of a β-sialon fluorescent material further superior in emission luminance.

The first heat-treated product to be subjected to the second heat treatment step is obtained in the first heat treatment step, at least a portion of the first heat-treated product in the second mixture may be replaced with a commercially available or separately prepared β-sialon fluorescent material.

Examples of the second europium compound include europium-containing oxide, hydroxide, nitride, oxynitride, fluoride, and chloride. In place of at least a portion of the second europium compound, a simple europium metal or a europium alloy may be used. Specific examples of the second europium compound include europium oxide ($Eu_2O_3$), europium nitride (EuN), and europium fluoride ($EuF_3$). For instance, at least one selected from the group consisting of europium oxide ($Eu_2O_3$), europium nitride (EuN), and europium fluoride ($EuF_3$) is used, and europium oxide is used because europium oxide is easy to handle. These second europium compounds may be used alone or in combination.

The particle diameter of the second europium compound to be used as a raw material is not particularly limited, and may be selected as appropriate from common particle diameters. The mean particle diameter of the second europium compound may be, for instance, from 0.01 μm to 20 μm, or from 0.1 μm to 10.0 μm.

The purity of the second europium compound is not particularly limited, and may be, for instance, 95% by weight or more, and 99.5% by weight or more.

The weight ratio of the second europium compound to the first heat-treated product in the second heat treatment step is not particularly limited, and may be appropriately selected in a manner to achieve the desired effect. The weight ratio of the second europium compound to the first heat-treated product (100%) may be, for instance, 0.01% or more, 0.05% or more, or 0.1% or more. The weight ratio of the second europium compound to the first heat-treated product (100%) may be also, for instance, 50% or less, 20% or less, 15% or less, or 10% or less.

In the second heat treatment step, the heat-treating may be performed in such a manner that the gaseous product generated from a europium compound comes into contact with the first heat-treated product. For instance, the first heat-treated product and the second europium compound may be mixed and put into a same container and then heat-treated, or the first heat-treated product and the second europium compound may be put into a same container without being mixed together or into different containers and then heat-treated. Alternatively, a portion of the second europium compound may be mixed with the first heat-treated product, and the resultant mixture and the remaining portion of the second europium compound may be put into a same container without being mixed together or into different containers, and then heat-treated. When the first heat-treated product and the second europium compound are mixed, it is preferred that they should be mixed as uniformly as possible.

The rare gas atmosphere in the second heat treatment step will suffice as long as it contains at least one rare gas, such as helium, neon, or argon, and the rare gas atmosphere preferably contains at least argon. Argon is preferable because of its high versatility. The rare gas atmosphere may contain oxygen, hydrogen, and nitrogen, in addition to the rare gas. The content of the rare gas in the rare gas atmosphere may be, for instance, 95% by volume or more, and 99% by volume or more.

The pressure in the second heat treatment step is not particularly limited, and may be, for instance, in the range of from ordinary pressure to 1 MPa, and may be from ordinary pressure to 0.2 MPa.

The heat treatment temperature in the second heat treatment step may be, for instance, from 1300° C. to 1600° C., or from 1350° C. to 1500° C. The temperature of the second heat treatment step is preferably lower than the temperature of the first heat treatment step. The second heat treatment is believed to cause thermal decomposition of, for instance, an unstable phase and a low crystalline portion contained in the fluorescent particles, resulting in more stable fluorescent material particles with high crystallinity. Furthermore, the thermolysis product generated in the second heat treatment step may contain, for instance, simple silicon, and such a thermolysis product can be removed by the subsequent acid treatment.

The time for the heat treatment in the second heat treatment step is not particularly limited, and may be selected depending on the purpose, for example. The time for the heat treatment in the second heat treatment step may be, for instance, from 1 hour to 48 hours, or from 2 hours to 20 hours.

The second heat treatment step may include a step of, for instance, crushing and grinding the resultant heat-treated product. The crushing treatment, the grinding treatment, or the like can be performed by the previously described methods.

In the method for producing a β-sialon fluorescent material, a third heat treatment step of heating a first heat-treated product may be performed before the second heat treatment step. Performing a third heat treatment step facilitates production of a β-sialon fluorescent material still more superior in emission luminance.

The temperature of the heat treatment in the third heat treatment step is not particularly limited, and may be, for instance, from 1800° C. to 2100° C., from 1850° C. to 2040° C., or from 1900° C. to less than 2040° C. The temperature of the heat treatment in the third heat treatment step may be the same as or lower than the temperature of the heat treatment in the first heat treatment step. When there is a difference in temperature of the heat treatment between the first heat treatment step and the third heat treatment step, the difference in temperature may be 10° C. or more, or 20° C. or more. The upper limit of the difference in temperature may be 100° C. or less.

The atmosphere in the third heat treatment step is not particularly limited. The atmosphere of the third heat treatment step may be an atmosphere containing a nitrogen gas, and may be essentially a nitrogen gas atmosphere. When the atmosphere of the third heat treatment step contains a nitrogen gas, the atmosphere may contain another gas, such as hydrogen, oxygen, or ammonia, in addition to the nitrogen gas. The content of the nitrogen gas in the atmosphere of the third heat treatment step may be, for instance, 90% by volume or more, or 95% by volume or more.

The pressure in the third heat treatment step is not particularly limited, and may be selected as appropriate depending on, for example, the purpose. The pressure may be, for instance, from ordinary pressure to 200 MPa. To suppress degradation of the β-sialon fluorescent material to be generated, the pressure may be high, specifically may be from 0.1 MPa to 200 MPa, or from 0.6 MPa to 1.2 MPa, because this range imposes less restriction on industrial equipment.

In the third heat treatment step, the heat treatment is performed, for instance, by elevating the temperature from room temperature to a predetermined temperature. The time required for elevating the temperature is not particularly limited, and may be, for instance, from 1 hour to 48 hours, from 2 hours to 24 hours, or from 3 hours to 20 hours.

In the third heat treatment step, a retention time at a predetermined temperature may be provided. The retention time is not particularly limited, and may be, for instance, from 1 hour to 48 hours, from 2 hours to 30 hours, or from 3 hours to 20 hours.

The time for lowering the temperature from a predetermined temperature to room temperature in the third heat treatment step is not particularly limited, and may be, for instance, from 0.1 hour to 20 hours, from 1 hour to 15 hours, or from 3 hours to 12 hours. A retention time may be provided at a temperature appropriately selected from the predetermined temperature to room temperature, while the temperature is being lowered from the predetermined temperature to room temperature. This retention time may be adjusted, for instance, to further improve emission luminance of the β-sialon fluorescent material to be produced.

When the method for producing a β-sialon fluorescent material includes the third heat treatment step, the first heat-treated product that underwent the third heat-treatment is used in the second heat treatment step. The third heat treatment step in the method for producing a β-sialon fluorescent material may be performed more than once. In that case, the first heat-treated product after the final third heat treatment is used for the second heat treatment step.

Acid Treatment Step

The method for producing the β-sialon fluorescent material may include an acid-treatment step of acid-treating a second heat-treated product obtained in the second heat treatment step. The acid used in the acid treatment may be a mixed acid containing hydrofluoric acid and nitric acid. The mixed acid may further contain, for instance, hydrochloric acid in addition to hydrofluoric acid and nitric acid. The total content of hydrofluoric acid and nitric acid contained in the mixed acid may be, for instance, 30% by weight or more, and 50% by weight or more. Furthermore, the ratio by weight of hydrofluoric acid to nitric acid (hydrofluoric acid/nitric acid) in the mixed acid may be, for instance, from 0.3 to 3.0, or from 0.5 to 2.0.

The amount of acid used in the acid treatment is not particularly limited. The amount of acid may be, for instance, 1.2 times by weight or more, or from 2 times by weight to 10 times by weight of the second heat-treated product.

The temperature, the time required, and so forth in the acid treatment step are not particularly limited, and may be selected as appropriate depending on, for example, the components of the acid to be used in the treatment. The temperature of the acid treatment may be, for instance, from 20° C. to 90° C., or from 40° C. to 80° C. The time for the acid treatment may be, for instance, from one minute to 24 hours, or 5 minutes to 2 hours.

The washing step is not particularly limited as long as at least a portion of acid adhered during the acid treatment step can be removed, and the washing method can be selected as appropriate from common washing methods. For washing, for instance, alcohol, such as ethanol, and water may be used. The washing step may include drying treatment after washing.

The β-sialon fluorescent material of the present embodiment is a β-sialon fluorescent material obtained by the production method of the present embodiment. The β-sialon fluorescent material of the present embodiment is superior in light emitting luminance and stability as a result of being obtained by the specific production method. Although the β-sialon fluorescent material of the present embodiment has a composition represented by the previously given formula, the β-sialon fluorescent material may contain a minute amount of fluorine. When the β-sialon fluorescent material contains fluorine, the content may be, for instance, from 50 ppm to 1500 ppm, or from 70 ppm to 700 ppm. The fluorine may be derived from, for instance, the raw materials of the raw material mixture, the flux, and the hydrogen fluoride to be used in the acid treatment.

The β-sialon fluorescent material according to the present embodiment absorbs light in the ultraviolet region to visible light in the short wavelength region, and has a peak light emission wavelength on the long-wavelength side compared to the peak light emission wavelength of the excitation light. The visible light in the short wavelength region is mainly in the blue light region. Specifically, the β-sialon fluorescent material according to the present embodiment is excited by light from an excitation light source having a peak light emission wavelength in the wavelength range of from 250 nm to 480 nm, and emits fluorescence having a peak light emission wavelength in the wavelength range of from 520 nm to 560 nm. A fluorescent material having high light emission efficiency can be provided by using an excitation light source in this range. In particular, it is preferred that an excitation light source having a main peak light emission wavelength in the range of from 350 nm to 480 nm be used, and it is more preferred that an excitation light source having a peak light emission wavelength in the range of from 420 nm to 470 nm be used.

The β-sialon fluorescent material according to the present embodiment also has high crystallinity. For instance, since a glass material (amorphous) has a loose structure, the reaction conditions in the production steps of a fluorescent material must be controlled to be strictly uniform. Otherwise, the ratio of components in the resultant fluorescent material varies, causing chromaticity unevenness. In contrast, the β-sialon fluorescent material according to the present embodiment is not a glass material but a powder or a granule having high crystallinity, and thus can be easily produced and processed. In addition, the β-sialon fluorescent material according to the present embodiment can be uniformly dispersed, for example, in an organic medium, so that light emitting plastics and polymeric thin film materials, for example, can be readily prepared using the β-sialon fluorescent material according to the present embodiment. Specifically, the β-sialon fluorescent material according to the present embodiment has a crystalline phase of 50% by weight or more, preferably 80% by weight or more. This indicates the proportion of the crystalline phase having light emission properties, and a crystalline phase of 50% by weight or more ensures emission of light enough for practical use.

The mean particle diameter of the β-sialon fluorescent material according to the present embodiment may be, for instance, from 4 μm to 40 μm, or from 8 μm to 30 μm in terms of volume median diameter (Dm) measured using the Coulter principle. Preferably, the β-sialon fluorescent material contains particles of this mean particle diameter at high frequency. That is, the particle sizes are preferably distributed in a narrow range. A light emitting device including a β-sialon fluorescent material having a particle size distribution with a narrow half bandwidth has less color unevenness, and thus has favorable color tone. Furthermore, the larger the mean particle diameter, the higher the light absorption and the light emission efficiency. As described above, by incorporating a fluorescent material having a large mean particle diameter and optically superior characteristics in a light emitting device, the light emission efficiency of the light emitting device improves.

EXAMPLES

Hereinafter, the present invention will be specifically explained with reference to Examples. The present invention, however, is not limited to the following Examples as long as the gist of the invention is not deviated from.

Example 1

Silicon nitride ($Si_3N_4$), aluminium nitride (AlN), aluminium oxide, and europium oxide ($Eu_2O_3$), which are raw material compounds, were weighed so that the molar ratio satisfies Si:Al:Eu=5.78:0.22:0.015, and mixed. To adjust O and N to the defined value of z in the general formula, aluminium nitride and aluminium oxide were charged so that aluminium nitride:aluminium oxide=80:20 was satisfied. The raw material mixture was filled into a boron nitride crucible, and was subjected to a first heat treatment under the conditions of: a nitrogen atmosphere, a pressure of about 0.92 MPa (gauge pressure), time for elevating the temperature to 2030° C. of 10 hours, the subsequent time for lowering the temperature to room temperature of 6 hours, to obtain a first heat-treated product.

The resultant first heat-treated product was ground, and the ground product was filled into a boron nitride crucible and then subjected to a third heat treatment step under the conditions of: a nitrogen atmosphere, a pressure of about 0.92 MPa (gauge pressure), a time for elevating the temperature to 2000° C. of 10 hours, a retention time of 5 hours at a temperature of 1500° C. in the middle of the subsequent lowering of the temperature to room temperature, to obtain a heat-treated product that underwent the third heat treatment.

The resultant heat-treated product that underwent the third heat treatment and europium oxide in an amount of 0.5% in weight ratio relative to this heat-treated product were weighed and mixed to obtain a mixture. The resultant mixture was subjected to a second heat treatment in an argon atmosphere at a temperature of 1400° C. for 5 hours to obtain a second heat-treated product.

The resultant second heat-treated product was dispersed and classified, and put into a mixed acid in a weight ratio of 55% HF:60% $HNO_3$=1:1. The mixture was stirred at a temperature of 50° C. for 30 minutes, and then washed and dried to obtain a β-sialon fluorescent material of Example 1 (β-sialon fluorescent material 1).

Comparative Example 1

A synthesis was conducted under the same conditions as those in Example 1 except that no europium compound was added at the time of the second heat treatment in Example 1, to obtain a β-sialon fluorescent material (β-sialon fluorescent material C1).

Example 2

A synthesis was conducted under the same conditions as those in Example 1 with the same composition ratio of Si:Al:Eu except that the ratio of aluminium nitride:aluminium oxide was changed to 95:5 to obtain a raw material mixture, and that the third heat treatment step was not carried out, to obtain a β-sialon fluorescent material (β-sialon fluorescent material 2).

Comparative Example 2

A synthesis was conducted under the same conditions as those in Example 2 except that no europium compound was added at the time of the second heat treatment in Example 2, to obtain a β-sialon fluorescent material (β-sialon fluorescent material C2).

<Evaluation>

For each of the resultant fluorescent materials, the mean particle diameter (Dm, median diameter) was measured using a particle-size distribution measuring device (Multisizer manufactured by Beckman Coulter) by the pore electrical resistance method (Electrical sensing zone method) based on the Coulter principle.

The light emission properties of the fluorescent materials were measured by a fluorescence spectrophotometer: F-4500 (manufactured by Hitachi High-Technologies Corporation). Specifically, the wavelength of the excitation light was set to 460 nm, and the light emission spectra were measured. The relative light emission intensities and peak light emission wavelengths (nm) (%) of the maximum peaks of the resultant respective light emission spectra were obtained. Here, the relative light emission intensity was calculated using β-sialon fluorescent material C1 as a criterion.

For each of the resultant fluorescent materials, the fluorine content (ppm) was measured using an automatic combustion ion chromatography.

The results are shown in Table 1 below.

TABLE 1

| | Mean particle diameter (μm) | Relative light emission intensity (%) | Peak light emission wavelength (nm) | Fluorine content (ppm) |
|---|---|---|---|---|
| Example 1 | 20.1 | 108.9 | 544 | 160 |
| Comparative Example 1 | 21.8 | 100.0 | 544 | 110 |
| Example 2 | 22.2 | 108.4 | 544 | 320 |
| Comparative Example 2 | 21.3 | 96.7 | 542 | 230 |

The light emission spectra of β-sialon fluorescent materials 1, C1, and C2 respectively obtained in Example 1, Comparative Example 1, and Comparative Example 2 were normalized to the maximum light emission intensity of β-sialon fluorescent material C1, and are shown in FIG. 1. The light emission spectrum of β-sialon fluorescent material 2 obtained in Example 2 was substantially the same as that of β-sialon fluorescent material 1. As shown in Table 1, β-sialon fluorescent materials 1 and 2 have high light emission intensity and high luminance. As for peak light emission wavelength, the Examples and the Comparative Examples were substantially the same.

Figure 2:
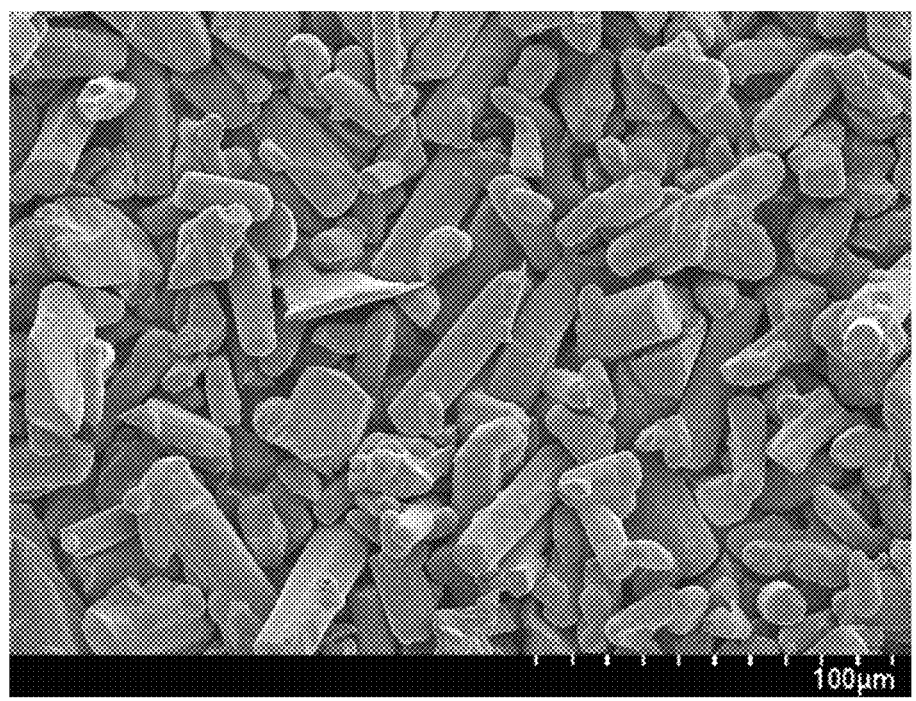
FIG. 2 is an image showing an example of a scanning electron microscope (SEM) image of a β-sialon fluorescent material according to Example 1.
Figure 3:
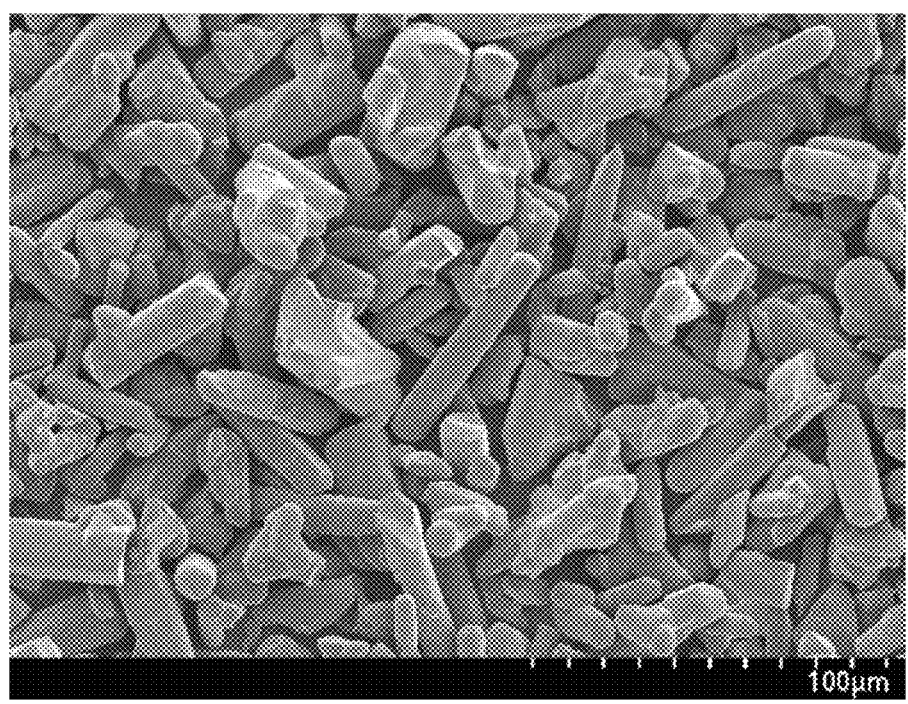
FIG. 3 is an image showing an example of an SEM image of a β-sialon fluorescent material according to Comparative Example 1.

Scanning electron microscope (SEM) images showing the particle shapes of β-sialon fluorescent materials 1 and C1 respectively obtained in Example 1 and Comparative Example 1 are shown in FIGS. 2 and 3. It is clear from FIGS. 2 and 3 that the particle shapes of β-sialon fluorescent materials 1 and C1 are substantially the same. This is believed to indicate that no change in particle diameter occurs in the second heat treatment step. That is, the addition of a europium compound in the second heat treatment step is believed to have little effect on the particle growth, but have a significant reductive effect.

The fluorine content in β-sialon fluorescent material 1 was 160 ppm, whereas the fluorine content in β-sialon fluorescent material C1 was 110 ppm. This is believed to indicate that only a small portion of HF at the time of the acid treatment is contained on the surface of β-sialon in the form of a europium compound, such as $EuF_3$.

β-sialon fluorescent materials obtained according to the method of the present embodiment are extremely superior in light emission properties, and a light emitting device including the β-sialon fluorescent material and including, in particular, a blue light emitting diode or a UV light emitting diode as a light source may be suitably used as a light source for lighting, LED displays, backlight sources, traffic signals, illuminated switches, various sensors and various indicators that incorporate.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

All publications, patent applications, and technical standards mentioned in this specification are herein incorporated by reference to the same extent as if each individual publication, patent application, or technical standard was specifically and individually indicated to be incorporated by reference.

What is claimed is:

1. A method for producing a β-sialon fluorescent material, the method comprising:
   heat-treating a mixture containing an aluminium compound, a first europium compound, and silicon nitride to obtain a first heat-treated product; and
   heat-treating the first heat-treated product with a second europium compound in a rare gas atmosphere to obtain a second heat-treated product.

2. The method according to claim 1, wherein the second europium compound comprises europium oxide.

3. The method according to claim 1, wherein the rare gas atmosphere comprises argon.

4. The method according to claim 1, wherein a weight ratio of the second europium compound to the first heat-treated product is from 0.01% to 20%.

5. The method according to claim 1, wherein heat-treating a mixture of the first heat-treated product and the second europium compound occurs in the same container.

6. The method according to claim 1, further comprising acid-treating the second heat-treated product.

7. The method according to claim 6, wherein the acid-treating is performed with a mixed acid containing hydrofluoric acid and nitric acid.

8. The method according to claim 1, wherein the second heat-treated product is obtained by heat-treating at 1300° C. to 1600° C.

9. The method according to claim 1, wherein the first heat-treated product is obtained by heat-treating at 1850° C. to 2100° C.

10. A method for producing a β-sialon fluorescent material, the method comprising:
    heat-treating a mixture containing an aluminium compound, a first europium compound, and silicon nitride to obtain a first heat-treated product;
    further heat-treating the first heat-treated product to obtain a further heated first heat-treated product; and
    heat-treating the further heated first heat-treated product with the second europium compound in a rare gas atmosphere to obtain a second heat-treated product.

11. The method according to claim 1, wherein the β-sialon fluorescent material has a composition represented by the following formula:

$$Si_{6-z}Al_zO_zN_{8-z}:Eu$$

wherein z satisfies $0.0 < z \leq 4.2$.

* * * * *